Figure 1:
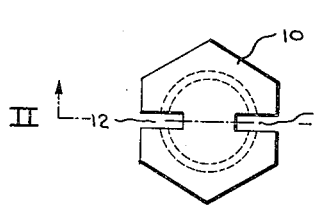

Sept. 27, 1938.                W. H. MURRAY                 2,131,407
                LOCK FOR THREADED FASTENING INSTRUMENTALITIES
                            Filed June 21, 1937

Inventor
WILLIAM H. MURRAY

By Beaman & Langford
Attorneys

Patented Sept. 27, 1938

2,131,407

UNITED STATES PATENT OFFICE 2,131,407

LOCK FOR THREADED FASTENING INSTRUMENTALITIES

William H. Murray, Detroit, Mich.

Application June 21, 1937, Serial No. 149,347

5 Claims. (Cl. 151—23)

The present invention relates to improvements in locks for threaded fastening instrumentalities such as bolts, nuts, screws and the like to prevent unintentional loosening or rotation.

At the present time only two types of nut locks are in commercial use, namely, cotter keys and spring washers. Cotter keys necessitate the proper alignment of the apertures in the nut and bolt before application of the cotter key may be made. Due to this fact it is oftentimes impossible to draw the nut completely up and yet have the openings in alignment. Furthermore, cotter keys are difficult to be removed and they can not be conveniently re-used. Spring washers are generally satisfactory. However, they will oftentimes loosen and are relatively expensive when compared with the lock of the present invention.

Heretofore in the patent art it has been proposed to provide a groove or channel in a bolt to receive what might be characterized as a locking pawl capable of interlocking with the threads of the nut or with one or more grooves or channels in the nut. The patents to Jargick No. 969,537 and to Libby et al. No. 979,177 are typical of such proposals.

My improved lock preferably takes the general shape of a hairpin formed from an integral piece of relatively stiff spring metal. The looped end of the lock when in use is disposed over one end or the other of the bolt or screw with the leg portions disposed axially of the bolt or the screw and received in suitable grooves or channels in one of the threaded parts and engaging with the threads of the coacting threaded part. In practice the grooves or channels are usually put in the body of the threaded part of the bolt or screw. However, it is entirely feasible to channel or groove the nut or other threaded body in which the bolt or screw is received.

One object of the invention is to provide a relatively inexpensive U-shaped locking member of spring metal adapted to be positioned between threaded parts and to engage with the threads of one of said parts in a manner permitting rotation in a tightening direction and preventing rotation in a loosening direction.

Another object is to provide a device of the character described which is generally U-shaped in form and which when in use the looped end is disposed under one of the ends of the bolt or screw with which it is associated as to permit its removal by engaging the looped end and withdrawing the same axially.

Another object is to provide a generally U-shaped locking member of relatively stiff resilient metal which when confined in axially extending grooves of a bolt or screw will have an inherent tendency to spring outward into engagement with the threads of the threaded part with which the bolt or screws is associated in its use; the thread engaging parts of the locking member being so shaped and disposed as to permit a tightening relative rotation between the threaded parts while at the same time resisting relative rotation in a loosening direction entirely through a wedging action between the locking member and the threads of the threaded part engaged thereby.

A further object is to provide a locking member of the type described capable of use in connection with a specially machined bolt or screw yet functioning in the manner intended when used in connection with a nut or other threaded part of conventionally threaded structure.

A still further object is to provide a U-shaped locking member of the type described which is disposed between coacting threaded parts associated by relative rotation which coacts with the threads of one of such parts to prevent rotation in a loosening direction yet is capable of being readily removed by axial movement to permit relative rotation between the threaded parts in a loosening direction.

These and other objects and advantages residing in the present invention should readily appear to those skilled in the art from a consideration of the accompanying drawing taken in connection with the following detailed description. The nature and scope of the invention desirous of being protected is set forth in the appended claims.

In the drawing—

Figure 5:
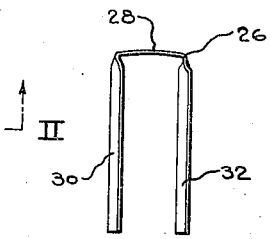
Figure 3:
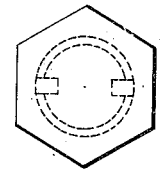
Figure 2:
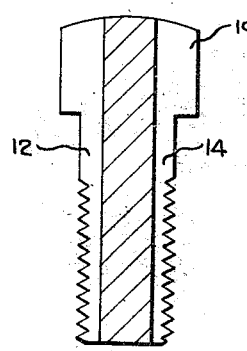
Figure 6:
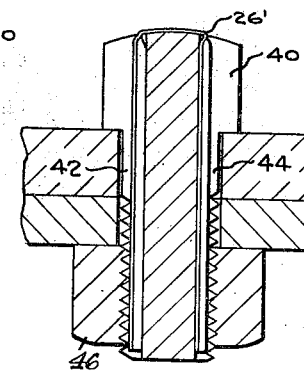
Figure 4:
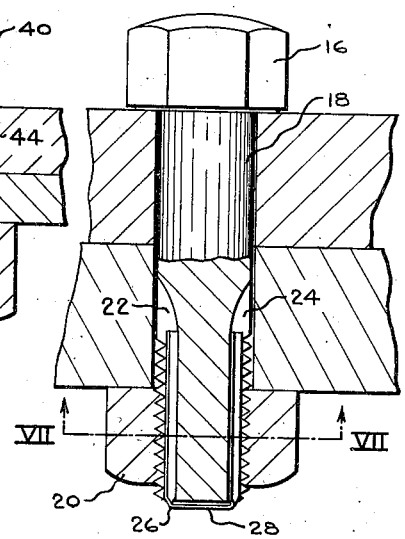
Figure 9:
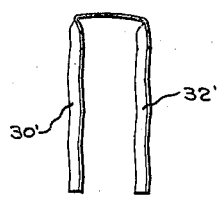
Figure 7:
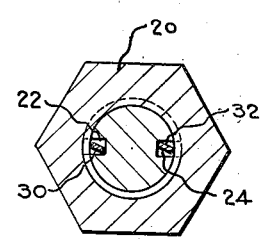
Figure 8:
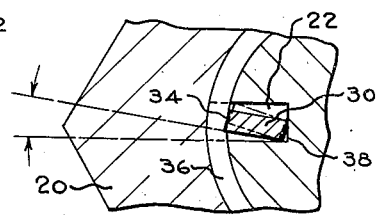

Figs. 1 and 2 are top and cross-sectional views, respectively, of a cap screw constructed to be used in connection with my improved type of locking member, Figs. 3 and 4 are top and side elevational views, respectively, of a bolt and nut assembly constructed to accommodate the locking member of the present invention, Fig. 5 is a side elevational view of one form of my improved locking member, Fig. 6 is a longitudinal cross-sectional view of a nut and bolt assembly in which the locking member is assembled in position from the opposite end of the bolt from that viewed in Fig. 4, Fig. 7 is a cross-sectional view taken on line VII—VII of Fig. 4, Fig. 8 is an enlarged fragmentary detailed cross-sectional view showing the manner in which the locking member coacts with the threaded parts, and Fig. 9 is a view similar to Fig. 5 of a modified form of the locking member having the leg portions thereof of undulate shape.

In Figs. 1 and 2 is shown a cap screw 10 which may be of conventional construction having milled or otherwise machined or provided therein a pair of axially extending grooves or channels 12 and 14.

In Figs. 3 and 4 is shown a nut and bolt assembly which may be of any suitable conventional construction comprising a bolt having a head 16, a shank 18 and a nut 20. The shank 18 of the bolt is of the usual construction with the exception that channels or grooves 22 and 24 have been milled or otherwise provided therein.

My improved locking member, as shown in Fig. 5, is preferably of U-shaped form closely resembling a hairpin in appearance. The locking member generally designated by reference character 26 is preferably formed as an integral member from wire stock of relatively stiff and highly resilient metal and comprises a looped end 28 and leg portions 30 and 32. As shown, the wire structure from which the locking member 26 is fabricated is of rectangular cross-section and the legs 30 and 32 have been twisted so as to be annularly disposed as appears more clearly from Figs. 7 and 8.

For the reason that the present invention contemplates the use of the locking member 26 with nuts and threaded parts of conventional shape and construction without any special provisions for coaction between the same and the locking member, the annularity of the legs 30 and 32 is important for successful operation of the invention. Generally speaking when viewed in cross-section the angle of inclination of a plane through the points of engagement between the locking member and the threaded parts to a radial plane should be relatively slight so that the microscopic teeth that exist at the apex of the threads of the nut or other threaded part are sufficient to be able to grip the side of the leg portions of the member 26 presented thereto and tend to rock the same into the radial plane reducing the angle of inclination with reference thereto. As more clearly appears from Fig. 8 the angle of inclination of the leg 30 with the radial plane should be in the order of 10°. The dimensions of the grooves 22 and 24 should be such that in the presence of the threads of the nut or other threaded part, the legs 30 and 32 are crowded in the channels 22 and 24 tending to increase the normal angle of inclination. In this way a stress is set up in both legs 30 and 32 which tends at all times to retain the edge 34 in stressed contact with the threads 36 of the nut 20. Shown greatly exaggerated for the purpose of illustration in Fig. 8, the position of the leg 30 in dotted outline indicates the stressed position resulting from association of the locking member 26 between the threaded parts and during a period of relative rotation between the threaded parts in a tightening direction while the solid outline of the leg 30 indicates the position to which it is rocked about its edge 38, upon attempted relative rotation in a loosening direction due to the biting in that takes place between the edge 34 and the microscopic roughened apex of the threads 36.

The locking member 26 may be either associated with the threaded parts prior to the time the same are fully tightened upon each other or afterwards. As should readily be understood from the inspection of Fig. 8, the nut 20 may be rotated clockwise to tighten the same upon the bolt and such action will merely rock the legs 30 about the end 38 in a clockwise direction without any binding or wedging action. For this reason it is possible through the use of my improved locking member to tighten up a nut at any time without the removal of the locking member which is not possible with cotter keys. Should it become desirable to remove the nut 20 it is only necessary for the operator to apply a screwdriver or other suitable instrument against the looped end 28 and remove the locking member from the bolt grooves by an axial movement. As the locking members are in no way injured through use or removal they can be repeatedly used to perform the function for which they are designed.

When the locking member 26 is to be used with a cap screw 10 the looped end 28 will overlie the head of the screw and the legs 30 and 32 will coact in the manner described with reference to Fig. 8 with the threads of the tapped hole in which the cap screw is inserted. The cap screw 10 can be tightened down at any time without removal of the locking member 28, the presence of which in no way interferes with the application of wrenches of usual construction including socket wrenches. The removal of the cap screw is effected by applying a suitable tool to the looped end 28 of the locking member 26 and withdrawing the same.

In Fig. 6 is shown a bolt 40 which has been milled or otherwise machined in the manner of the cap screw shown in Figs. 1 and 2 to provide grooves or channels 42 and 44; the nut 46 coacts with the threaded end of the bolt 40 in the usual manner. With this arrangement the locking member 26' which corresponds to that shown in Fig. 5 can be inserted from the head end of the bolt as distinguished from the construction shown in Fig. 4. When in position the locking member 26' functions in the same manner as that shown in Fig. 4 and coacts with the threads of the nut 46 in the same manner as with the threads of the nut 20. The arrangement shown in Fig. 6 would be preferred over that shown in Fig. 4 in cases where lack of clearance on the nut side of the nut and bolt assembly would prevent withdrawal of the locking member.

In Fig. 9 is shown a modified form of a locking member which may be identical with that shown in Fig. 5 with the exception that the legs 30' and 32' are of undulate configuration. In this manner the resistance to removal from the grooves in which the legs of the locking members are received can be increased. Another advantage of such a construction resides in the fact that the stress acting against the threads of a nut, for example, is localized at a plurality of spaced points throughout the length of the legs 30' and 32' further assuring positive locking against rotation between the interengaged threaded parts in a loosening direction.

It should be readily apparent to those skilled in the art that in lieu of channels in the bolt that the channels could be provided in the nut. The same action between the legs and the locking member will take place with the threads of the bolt as heretofore described with reference to the threads of the nut.

As heretofore stated, the locking member 26 is preferably of U-shaped construction for the reason that it facilitates application and removal. At the same time the looped end 28 functions to resist any tendency to vary the normal unstressed angle of inclination of the legs 30 and 32. It is conceivable, however, that the principles of the present invention may be readily employed by those skilled in the art without employing locking members of the specific shape and construction shown in Figs. 5 and 9. Accordingly, I do not wish to limit myself to the specific details that have been illustrated herein for the purpose of disclosing the principles of my invention except as herein defined in the annexed claims.

Having described my invention what I claim and desire to protect by Letters Patent is:

1. In combination, inner and outer parts having threaded concentric portions in interlocking engagement with each other, a locking bar of U-shaped configuration having a looped end and a pair of leg portions, seats in one of said parts for said leg portions, clearances defined by said part having seat portions to enable said leg portions to rock about one of their longitudinal edges for engagement with the threads of the other of said parts, the looped portion of said locking bar resisting rocking movement of said leg portions away from the threads of said other part and continuously acting to urge said leg portions toward the threads of said other part, said seats and leg portions being so located and dimensioned that the points of engagement between said leg portions and the threads of said other part are only slightly disposed to one side of the radial planes through said seats whereby the roughness of the cut threads of said other part is sufficient to urge said legs toward said radial planes upon relative rotation of said parts in one direction to effectively wedge said legs between said parts preventing continued relative rotation of said parts in said direction.

2. In combination, a threaded fastening member having a pair of grooves therein defined in the body of the threaded part and extending within the root of the threads, a locking member U-shaped in configuration having a looped end adapted to embrace one end of said fastening member and having leg portions adapted to be received in said grooves, said leg portions when disposed in said grooves engaging along one edge thereof as a seat, the opposite edge portions of said legs projecting sufficiently because of a torsional stress maintained by the looped end of the U to be presented to the threads of a threaded part threadedly interlocked with said fastening member, said leg portion being so disposed in said grooves as to enable relative rotation of the interlocking threaded parts in one direction and functioning as a wedge to prevent relative rotation in an opposite direction, said looped end of said locking member enabling the same to be axially withdrawn from said groove.

3. In a lock for parts threaded one upon the other, a threaded part, a second threaded part adapted to receive said first part, one of said threaded parts having axially extending channels at least partially defined inwardly of the root of the threads, a U-shaped dogging bar of flat metal located in said channels and acting along its length of contact against the threads of the other of said parts at the outer diameter thereof, at least one of the legs of said bar in said channels having its cross-section angularly disposed to a radial plane, such angularity tending to be decreased upon relative rotation of said threaded parts in one direction to wedge said leg between said parts.

4. A locking member adapted to be inserted between relative rotatable concentrically disposed interengaging threaded members, said member being formed from relatively stiff resilient wire stock and of U-shaped configuration consisting of a looped end and a pair of parallel leg portions, said leg portions having inner and outer side portions, said inner and outer portions engaging with opposed portions of the threaded parts, planes through said side portions closely approaching radial planes, said looped portion establishing and tending to maintain the angularity of said leg portions.

5. A locking member adapted to be inserted between relative rotatable concentrically disposed interengaging threaded parts, said member being formed from relatively stiff resilient flat wire stock and of U-shaped configuration consisting of a looped end and a pair of leg portions of undulating shape, said leg portions having inner and outer side portions, said inner and outer side portions engaging with opposite portions of the threaded parts, planes through said side portions closely approaching radial planes, said looped portion establishing and tending to maintain the angularity of said leg portions.

WILLIAM H. MURRAY.